H. ROOS.
DYNAMO ELECTRIC MACHINE.
APPLICATION FILED APR. 29, 1910.
1,010,522.
Patented Dec. 5, 1911.
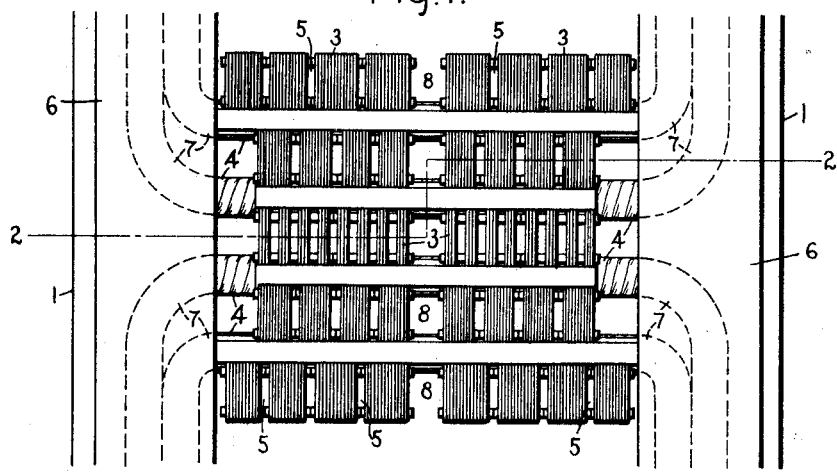
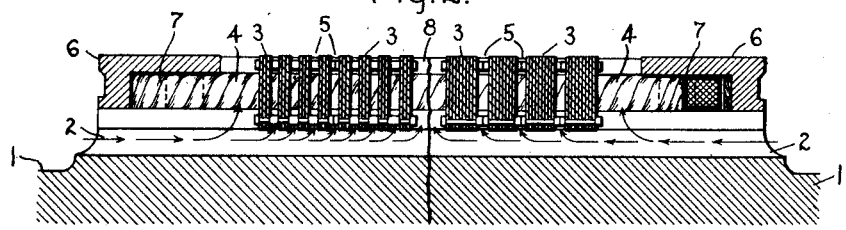
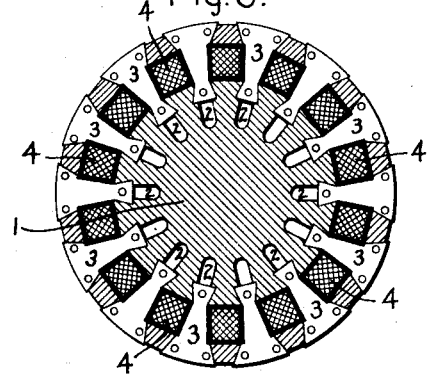
Witnesses:
Irving E. Steers.
J. Ellis Elen.
Inventor
Hermann Roos,
by Albert G. Davis
His Attorney

UNITED STATES PATENT OFFICE.

HERMANN ROOS, OF BERLIN, GERMANY, ASSIGNOR TO GENERAL ELECTRIC COMPANY, A CORPORATION OF NEW YORK.

DYNAMO-ELECTRIC MACHINE.

1,010,522.  Specification of Letters Patent.  Patented Dec. 5, 1911.

Application filed April 29, 1910. Serial No. 558,400.

*To all whom it may concern:*

Be it known that I, HERMANN ROOS, a subject of the Emperor of Germany, and resident of Berlin, Germany, have invented certain new and useful Improvements in Dynamo-Electric Machines, of which the following is a specification.

My invention relates to dynamo electric machines and more particularly to the revolving field magnets of such machines. The revolving field magnets of dynamo electric machines, such as turbo-generators, which rotate at high speed, are very difficult to properly ventilate, since the surface for cooling is small in comparison with the heat to be removed.

It is the object of my invention to obtain efficient ventilation of such a field magnet, which I accomplish by providing ventilating slots in the core body of the field magnet which extend parallel to its axis of rotation and entering into the upper part of which are teeth or ribs which are adjacent to the coils of the field magnet. Where a plurality of these teeth enter each of the slots, they may be spaced apart to form a ventilating space communicating with the ventilating slots.

Other features of novelty which characterize my invention are pointed out with particularity in the claims annexed to and forming a part of this specification.

For a better understanding of my invention, reference may be had to the following description taken in connection with the accompanying drawing, in which—

Figure 1 is a development of a revolving field magnet embodying my invention; Fig. 2 is a section on the line 2—2 of Fig. 1, and Fig. 3 is a sectional view taken at right angles to that of Fig. 2.

Referring to the drawing, the cylindrical core body 1 is provided with ventilating slots 2 formed in its periphery which extend parallel to the axis of rotation. A plurality of ribs or teeth 3, which complete the magnetic circuit of the field magnet and are adjacent to and serve to hold the coils 4 in place, enter the upper part of each of these slots. These teeth 3 are spaced apart so as to form radial ventilating spaces 5. In order to space apart the ribs or teeth 3, suitable spacing members are employed, which are inserted between the individual teeth and are so arranged that they do not disturb to any considerable extent the flow of cooling air. These ventilating spaces 5 are supplied with cooling air by the ventilating slots 2, which are equally spaced about the periphery of the core body. By this arrangement of the radial ventilating spaces 5, the heat, which is transmitted from the coils to the teeth or coil holders 3 by conduction, is drawn from the coil holders and thus the sides of the coils located within the effective iron are cooled, as well as the exposed surfaces of the coils in the ventilating spaces.

Since magnetic material is not necessary in the parts of the revolving field magnet situated between the magnetic poles, that is, in the neutral zone, and also a magnetic area as great as that at the poles is not necessary at the edges of the poles, the ribs or teeth 3 located in this portion of the field magnet may be made shorter in an axial direction than those situated in the pole areas. In this way a path is created for the cooling air which is indicated by the arrows in Fig. 2. The air enters the slots 2 below the inner edge of the retaining devices 6, which hold the end turns 7 of the coils in place against the action of centrifugal force, cools the end turns and escapes through the openings 8 produced by shortening the coil holders 3.

Instead of providing a great number of radial ventilating spaces between the coil holders, a single radial ventilating space may be provided in the center of the field magnet structure similar to the one shown at 8 in Fig. 1, through which the cooling air flows from the axially extending slots 2.

I desire it to be understood that my invention is not limited to the particular construction shown and described and I aim in the appended claims to cover all modifications which do not depart from the spirit and scope of my invention.

What I claim as new and desire to secure by Letters Patent of the United States, is—

1. In a rotary field magnet, a core body having ventilating slots formed therein and extending parallel to the axis of rotation, coils for said field magnet, and teeth adjacent to said coils and entering the upper parts of said slots.

2. In a rotary field magnet, a core body having ventilating slots formed therein and extending parallel to the axis of rotation, coils for said field magnet, and a plurality of teeth adjacent to each of said coils entering the upper parts of each of said slots and spaced apart to form a ventilating space communicating with said ventilating slots.

3. In a rotary field magnet, a core body having ventilating slots formed in its periphery and extending parallel to the axis of rotation, said slots being equally spaced apart about the periphery of said body, coils for said field magnet, and teeth adjacent to said coils and entering the upper part of said slots.

4. In a rotary field magnet, a substantially cylindrical core body having ventilating slots formed in its periphery and extending parallel to the axis of rotation, coils for said field magnet, and a plurality of teeth adjacent to each of said coils entering the upper part of each of said slots and spaced apart to form a ventilating space communicating with said ventilating slots.

5. In a rotating field magnet, a substantially cylindrical core body having ventilating slots formed in its periphery and extending parallel to the axis of rotation, said slots being equally spaced apart about the periphery of said body, coils for said field magnet, and a plurality of teeth adjacent to each of said coils entering the upper part of each of said slots and spaced apart to form a ventilating space communicating with said ventilating slots.

In witness whereof, I have hereunto set my hand this 8th day of April, 1910.

HERMANN ROOS.

Witnesses:
  KARL SULZBERGER,
  THEODOR SAHRIG.

---

Copies of this patent may be obtained for five cents each, by addressing the "Commissioner of Patents, Washington, D. C."